US012149890B2

(12) United States Patent
Fitz et al.

(10) Patent No.: US 12,149,890 B2
(45) Date of Patent: *Nov. 19, 2024

(54) NEURAL NETWORK-DRIVEN FREQUENCY TRANSLATION

(71) Applicant: Starkey Laboratories, Inc., Eden Prairie, MN (US)

(72) Inventors: Kelly Fitz, Eden Prairie, MN (US); Tao Zhang, Eden Prairie, MN (US); Buye Xu, Minnetonka, MN (US); Mohammad Abdollahi, Tbilisi (GE)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,979

(22) Filed: Jul. 6, 2023

(65) Prior Publication Data

US 2024/0007800 A1  Jan. 4, 2024

Related U.S. Application Data

(63) Continuation of application No. 17/647,532, filed on Jan. 10, 2022, now Pat. No. 11,736,870, which is a
(Continued)

(51) Int. Cl.
*H04R 25/00* (2006.01)
*G06N 3/08* (2023.01)
*G10L 25/84* (2013.01)

(52) U.S. Cl.
CPC .............. *H04R 25/353* (2013.01); *G06N 3/08* (2013.01); *G10L 25/84* (2013.01); *H04R 25/507* (2013.01);
(Continued)

(58) Field of Classification Search
CPC .... H04R 25/353; H04R 25/507; H04R 25/55; H04R 2225/021; H04R 2225/023; H04R 2225/025; G06N 3/08; G10L 25/84
See application file for complete search history.

(56) References Cited

U.S. PATENT DOCUMENTS

| 4,051,331 A | 9/1977 | Strong et al. |
| 5,014,319 A | 5/1991 | Leibman |

(Continued)

FOREIGN PATENT DOCUMENTS

| EP | 2099235 A2 | 9/2009 |
| EP | 1959713 B1 | 10/2009 |

(Continued)

OTHER PUBLICATIONS

"U.S. Appl. No. 12/043,827, Notice of Allowance mailed Jun. 10, 2011", 6 pgs.
(Continued)

*Primary Examiner* — Tuan D Nguyen
(74) *Attorney, Agent, or Firm* — Schwegman Lundberg & Woessner, P.A.

(57) ABSTRACT

Disclosed herein, among other things, are apparatus and methods for neural network-driven frequency translation for hearing assistance devices. Various embodiments include a method of signal processing an input signal in a hearing assistance device, the hearing assistance device including a receiver and a microphone. The method includes performing neural network processing to train a processor to identify acoustic features in a plurality of audio signals and predict target outputs for the plurality of audio signals, and using the trained processor to control frequency translation of the input signal.

20 Claims, 2 Drawing Sheets

Related U.S. Application Data continuation of application No. 16/797,157, filed on Feb. 21, 2020, now Pat. No. 11,223,909, which is a continuation of application No. 15/092,487, filed on Apr. 6, 2016, now Pat. No. 10,575,103.

(60) Provisional application No. 62/146,202, filed on Apr. 10, 2015.

(52) U.S. Cl.
CPC ....... *H04R 25/55* (2013.01); *H04R 2225/021* (2013.01); *H04R 2225/023* (2013.01); *H04R 2225/025* (2013.01)

(56) References Cited

U.S. PATENT DOCUMENTS

| | | |
|---|---|---|
| 5,771,299 A | 6/1998 | Melanson |
| 6,169,813 B1 | 1/2001 | Richardson et al. |
| 6,240,195 B1 | 5/2001 | Bindner et al. |
| 6,577,739 B1 | 6/2003 | Hurtig et al. |
| 6,980,665 B2 | 12/2005 | Kates |
| 7,146,316 B2 | 12/2006 | Alves |
| 7,248,711 B2 | 7/2007 | Allegro et al. |
| 7,580,536 B2 | 8/2009 | Carlile et al. |
| 7,757,276 B1 | 7/2010 | Lear |
| 8,000,487 B2 | 8/2011 | Fitz et al. |
| 8,073,171 B2 | 12/2011 | Haenggi et al. |
| 8,351,626 B2 | 1/2013 | Hersbach et al. |
| 8,503,704 B2 | 8/2013 | Francart et al. |
| 8,526,650 B2 | 9/2013 | Fitz |
| 8,761,422 B2 | 6/2014 | Fitz et al. |
| 8,762,305 B1 | 6/2014 | Chelian et al. |
| 8,775,341 B1 | 7/2014 | Commons |
| 8,787,605 B2 | 7/2014 | Fitz |
| 9,031,271 B2 | 5/2015 | Pontoppidan |
| 9,060,231 B2 | 6/2015 | Fitz |
| 9,167,366 B2 | 10/2015 | Valentine et al. |
| 9,843,875 B2 | 12/2017 | Fitz |
| 10,313,805 B2 | 6/2019 | Fitz |
| 10,575,103 B2 | 2/2020 | Fitz et al. |
| 11,223,909 B2 | 1/2022 | Fitz et al. |
| 11,736,870 B2 | 8/2023 | Fitz et al. |
| 2003/0112987 A1 | 6/2003 | Nordqvist et al. |
| 2004/0234079 A1 | 11/2004 | Schneider et al. |
| 2004/0264721 A1 | 12/2004 | Allegro et al. |
| 2006/0247922 A1 | 11/2006 | Hetherington et al. |
| 2006/0247992 A1 | 11/2006 | Hetherington et al. |
| 2006/0253209 A1 | 11/2006 | Hersbach et al. |
| 2008/0215330 A1 | 9/2008 | Haram et al. |
| 2009/0226016 A1 | 9/2009 | Fitz |
| 2009/0226025 A1 | 9/2009 | Howes et al. |
| 2010/0067721 A1 | 3/2010 | Tiefenau |
| 2010/0284557 A1 | 11/2010 | Fitz |
| 2010/0312730 A1 | 12/2010 | Weng et al. |
| 2011/0249843 A1 | 10/2011 | Holmberg et al. |
| 2012/0093329 A1 | 4/2012 | Francart et al. |
| 2012/0177236 A1 | 7/2012 | Fitz et al. |
| 2013/0030800 A1 | 1/2013 | Tracey et al. |
| 2013/0051565 A1 | 2/2013 | Pontoppidan |
| 2013/0051566 A1 | 2/2013 | Pontoppidan |
| 2013/0101123 A1 | 4/2013 | Hannemann |
| 2013/0208896 A1 | 8/2013 | Chatlani et al. |
| 2013/0243227 A1 | 9/2013 | Kinsbergen et al. |
| 2013/0322671 A1 | 12/2013 | Alexander |
| 2013/0336509 A1 | 12/2013 | Fitz |
| 2014/0119583 A1 | 5/2014 | Valentine et al. |
| 2014/0169600 A1 | 6/2014 | Fitz |
| 2014/0288938 A1 | 9/2014 | Kong |
| 2015/0036853 A1 | 2/2015 | Solum et al. |
| 2015/0058004 A1 | 2/2015 | Dimitriadis et al. |
| 2015/0124975 A1 | 5/2015 | Pontoppidan |
| 2016/0302014 A1 | 10/2016 | Fitz et al. |
| 2017/0094424 A1 | 3/2017 | Fitz |
| 2017/0156009 A9 | 6/2017 | Natarajan |
| 2018/0103328 A1 | 4/2018 | Fitz |
| 2020/0196069 A1 | 6/2020 | Fitz et al. |
| 2022/0353622 A1 | 11/2022 | Fitz et al. |

FOREIGN PATENT DOCUMENTS

| | | |
|---|---|---|
| EP | 2249587 A2 | 11/2010 |
| EP | 2375782 A1 | 10/2011 |
| WO | WO-0075920 A1 | 12/2000 |
| WO | WO-2007000161 A1 | 1/2007 |
| WO | WO-2007010479 A2 | 1/2007 |
| WO | WO-2007135198 A2 | 11/2007 |
| WO | WO-2013067145 A1 | 5/2013 |

OTHER PUBLICATIONS

"U.S. Appl. No. 12/774,356, Non Final Office Action mailed Aug. 16, 2012", 6 pgs.

"U.S. Appl. No. 12/774,356, Notice of Allowance mailed Jan. 8, 2013", 5 pgs.

"U.S. Appl. No. 12/774,356, Notice of Allowance mailed May 1, 2013", 6 pgs.

"U.S. Appl. No. 12/774,356, Response filed Dec. 17, 2012 to Non Final Office Action mailed Aug. 16, 2012", 8 pgs.

"U.S. Appl. No. 13/208,023, Final Office Action mailed Nov. 25, 2013", 5 pgs.

"U.S. Appl. No. 13/208,023, Non Final Office Action mailed May 29, 2013", 5 pgs.

"U.S. Appl. No. 13/208,023, Notice of Allowance mailed Feb. 10, 2014", 5 pgs.

"U.S. Appl. No. 13/208,023, Response filed Jan. 27, 2014 to Final Office Action mailed Nov. 25, 2013", 7 pgs.

"U.S. Appl. No. 13/208,023, Response filed Sep. 30, 2013 to Non Final Office Action mailed May 29, 2013", 6 pgs.

"U.S. Appl. No. 13/916,392, Notice of Allowance mailed Mar. 14, 2014", 9 pgs.

"U.S. Appl. No. 13/916,392, Notice of Allowance mailed Nov. 27, 2013", 12 pgs.

"U.S. Appl. No. 13/931,436, Non Final Office Action mailed Dec. 10, 2014", 8 pgs.

"U.S. Appl. No. 13/931,436, Notice of Allowance mailed Jun. 8, 2015", 8 pgs.

"U.S. Appl. No. 13/931,436, Response filed Mar. 10, 2015 to Non Final Office Action mailed Dec. 10, 2014", 7 pgs.

"U.S. Appl. No. 14/017,093, Non Final Office Action mailed Oct. 20, 2014", 5 pgs.

"U.S. Appl. No. 14/017,093, Notice of Allowance mailed Feb. 10, 2015", 8 pgs.

"U.S. Appl. No. 14/017,093, Preliminary Amendment Filed Jul. 9, 2014", 6 pgs.

"U.S. Appl. No. 14/017,093, Response filed Jan. 20, 2015 to Non Final Office Action mailed Oct. 20, 2014", 7 pgs.

"U.S. Appl. No. 14/866,678, Final Office Action mailed May 2, 2017", 15 pgs.

"U.S. Appl. No. 14/866,678, Non Final Office Action mailed Jan. 20, 2017", 13 pgs.

"U.S. Appl. No. 14/866,678, Notice of Allowance mailed Aug. 9, 2017", 8 pgs.

"U.S. Appl. No. 14/866,678, Response filed Apr. 20, 2017 to Non Final Office Action mailed Jan. 20, 2017", 10 pgs.

"U.S. Appl. No. 14/866,678, Response filed Aug. 1, 2017 to Final Office Action mailed May 2, 2017", 9 pgs.

"U.S. Appl. No. 15/092,487, Advisory Action mailed Jan. 22, 2018", 4 pgs.

"U.S. Appl. No. 15/092,487, Advisory Action mailed Aug. 20, 2019", 4 pgs.

"U.S. Appl. No. 15/092,487, Advisory Action mailed Nov. 5, 2018", 4 pgs.

"U.S. Appl. No. 15/092,487, Final Office Action mailed Jun. 6, 2019", 11 pgs.

"U.S. Appl. No. 15/092,487, Final Office Action mailed Aug. 29, 2018", 10 pgs.

(56) References Cited

OTHER PUBLICATIONS

"U.S. Appl. No. 15/092,487, Final Office Action mailed Oct. 25, 2017", 11 pgs.
"U.S. Appl. No. 15/092,487, Non Final Office Action mailed Feb. 21, 2018", 11 pgs.
"U.S. Appl. No. 15/092,487, Non Final Office Action mailed May 5, 2017", 8 pgs.
"U.S. Appl. No. 15/092,487, Non Final Office Action mailed Dec. 18, 2018", 9 pgs.
"U.S. Appl. No. 15/092,487, Notice of Allowance mailed Oct. 29, 2019", 9 pgs.
"U.S. Appl. No. 15/092,487, Response filed Apr. 18, 2019 to Non Final Office action mailed Dec. 18, 2018", 9 pgs.
"U.S. Appl. No. 15/092,487, Response Filed May 17, 2018 to Non Final Office Action mailed Feb. 21, 2018", 8 pgs.
"U.S. Appl. No. 15/092,487, Response filed Aug. 7, 2017 to Non Final Office Action mailed May 5, 2017", 7 pgs.
"U.S. Appl. No. 15/092,487, Response filed Oct. 24, 2018 to Final Office Action mailed Aug. 29, 2018", 9 pgs.
"U.S. Appl. No. 15/092,487, Response filed Dec. 22, 2017 to Final Office Action mailed Oct. 25, 2017", 8 pgs.
"U.S. Appl. No. 15/092,487, Response filed Aug. 6, 2019 to Final Office Action mailed Jun. 6, 2019", 9 pgs.
"U.S. Appl. No. 15/837,564, Final Office Action mailed Oct. 30, 2018", 22 pgs.
"U.S. Appl. No. 15/837,564, Non Final Office Action mailed Jun. 20, 2018", 19 pgs.
"U.S. Appl. No. 15/837,564, Notice of Allowance mailed Jan. 22, 2019", 9 pgs.
"U.S. Appl. No. 15/837,564, Response filed Sep. 20, 2018 to Non Final Office Action mailed Jun. 20, 2018", 13 pgs.
"U.S. Appl. No. 15/837,564, Response Filed Dec. 20, 2018 to Final Office Action mailed Oct. 30, 2018", 10 pgs.
"U.S. Appl. No. 16/797,157, Non Final Office Action mailed Apr. 14, 2021", 9 pgs.
"U.S. Appl. No. 16/797,157, Notice of Allowance mailed Sep. 7, 2021", 9 pgs.
"U.S. Appl. No. 16/797,157, Response filed Jul. 9, 2021 to Non Final Office Action mailed Apr. 14, 2021", 5 pgs.
"U.S. Appl. No. 17/647,532, Non Final Office Action mailed Dec. 7, 2022", 8 pgs.
"U.S. Appl. No. 17/647,532, Notice of Allowance mailed Apr. 3, 2023", 9 pgs.
"U.S. Appl. No. 17/647,532, Preliminary Amendment filed Jul. 21, 2022", 6 pgs.
"U.S. Appl. No. 17/647,532, Response filed Mar. 7, 2023 to Non Final Office Action mailed Dec. 7, 2022", 7 pgs.
"European Application No. 09250638.5, Summons to Attend Oral Proceedings mailed Jun. 20, 2016", 6 pgs.
"European Application Serial No. 09250638.5, Amendment filed Aug. 22, 2012", 15 pgs.
"European Application Serial No. 09250638.5, Extended Search Report mailed Jan. 20, 2012", 8 pgs.
"European Application Serial No. 09250638.5, Office Action mailed Sep. 25, 2013", 5 pgs.
"European Application Serial No. 09250638.5, Response filed Feb. 4, 2014 to Office Action mailed Sep. 25, 2013", 8 pgs.
"European Application Serial No. 10250883.5, Amendment filed Aug. 22, 2012", 16 pgs.
"European Application Serial No. 10250883.5, Extended European Search Report mailed Jan. 23, 2012", 8 pgs.
"European Application Serial No. 10250883.5, Office Action mailed Sep. 25, 2013", 6 pgs.
"European Application Serial No. 10250883.5, Response filed Feb. 4, 2014 to Office Action mailed Sep. 25, 2013", 2 pgs.
"European Application Serial No. 10250883.5, Summons to Attend Oral Proceedings mailed Jun. 28, 2016", 6 pgs.
"European Application Serial No. 13172173.0, Response filed Aug. 30, 2016 to Communication Pursuant to Article 94(3) EPC mailed Mar. 4, 2016", 8 pgs.
"European Application Serial No. 13172173.0, Communication Pursuant to Article 94(3) EPC mailed Mar. 4, 2016", 7 pgs.
"European Application Serial No. 13172173.0, Extended European Search Report mailed Apr. 9, 2015", 9 pgs.
"European Application Serial No. 13172173.0, Office Action mailed May 11, 2015", 2 pgs.
"European Application Serial No. 13172173.0, Response filed Nov. 6, 2015 to Extended European Search Report mailed Apr. 9, 2015", 27 pgs.
"European Application Serial No. 13172173.0, Summons to Attend Oral Proceedings mailed Dec. 15, 2017", 10 pgs.
"European Application Serial No. 16164478.6, Communication Pursuant to Article 94(3) EPC mailed May 16, 2017", 3 pgs.
"European Application Serial No. 16164478.6, Extended European Search Report mailed Aug. 10, 2016", 8 pgs.
"European Application Serial No. 16164478.6, Response filed Apr. 12, 2017 to Extended European Search Report mailed Aug. 10, 2016", 12 pgs.
"European Application Serial No. 16164478.6, Response filed Sep. 26, 2017 to Communication Pursuant to Article 94(3) EPC mailed May 16, 2017", 38pgs.
"European Application Serial No. 16190386.9, Partial European Search Report mailed Feb. 15, 2017", 7 pgs.
"European Application Serial No. 16190386.9, Response filed Dec. 14, 2017 to Communication pursuant to Rules 70(2) and 70a(2) mailed Jun. 20, 2017", 8 pgs.
Alexander, Joshua, "Frequency Lowering in Hearing Aids", ISHA Convention, (2012), 24 pgs.
Assmann, Peter F., et al., "Modeling the Perception Of Frequency-Shifted Vowels", ICSLP 2002: 7th International Conference on Spoken Language Processing. Denver, Colorado, [International Conference on Spoken Language Processing. (ICSLP)], Adelaide: Causal Productions, AU, XP007011577, ISBN: 978-1-876346-40-9, (Sep. 16, 2002), 4 pgs.
Chen, J., et al., "A Feature Study for Classification-Based Speech Separation at Low Signal-to-Noise Ratios", IEEE/ACM Trans. Audio Speech Lang. Process., 22, (2014), 1993-2002.
Fitz, Kelly, et al., "A New Algorithm for Bandwidth Association in Bandwidth-Enhanced Additive Sound Modeling", International Computer Music Conference Proceedings, (2000), 4 pgs.
Fitz, Kelly Raymond, "The Reassigned Bandwidth-Enhanced Method of Additive Synthesis", (1999), 163 pgs.
Healy, Eric W., et al., "An algorithm to improve speech recognition in noise for hearing-impaired listeners", Journal of the Acoustical Society of America, 134, (2013), 3029-3038.
Hermansen, K., et al., "Hearing aids for profoundly deaf people based on a new parametric concept", IEEE Workshop on Applications of Signal Processing to Audio and Acoustics, Final Program and Paper Summaries, vol. Iss. Oct. 17-20, 1993, (Oct. 1993), 89-92.
Kong, Ying-Yee, et al., "On the development of a frequency-lowering system that enhances place-of-articulation perception", Speech Commun., 54(1), (Jan. 1, 2012), 147-160.
Kuk, F., et al., "Linear Frequency Transposition: Extending the Audibility of High-Frequency Information", Hearing Review, (Oct. 2006), 5 pgs.
Makhoul, John, "Linear Prediction: A Tutorial Review", Proceedings of the IEEE, 63, (Apr. 1975), 561-580.
McDermott, H., et al., "Preliminary results with the AVR Impact frequency-transposing hearing aid", J Am Acad Audiol., 12(3), (Mar. 2001), 121-127.
McDermottt, H., et al., "Improvements in speech perception with use of the AVR TranSonic frequency-transposing hearing aid.", Journal of Speech, Language, and Hearing Research, 42(6), (Dec. 1999), 1323-1335.
McLoughlin, Ian Vince, et al., "Line spectral pairs", Signal Processing, Elsevier Science Publisher B.V. Amsterdam, NL, vol. 88, No. 3, (Nov. 14, 2007), 448-467.
Posen, M. P., et al., "Intelligibility of frequency-lowered speech produced by a channel vocoder", J Rehabil Res Dev., 30(1), (1993), 26-38.

(56) References Cited

OTHER PUBLICATIONS

Risberg, A., "A critical review of work on speech analyzing hearing aids", IEEE Transactions on Audio and Electroacoustics, 17(4), (1969), 290-297.

Roch, et al., "Foreground auditory scene analysis for hearing aids", Pattern Recognition Letters, Elsevier, Amsterdam, NL, vol. 28, No. 11, XP022099041, ISSN: 0167-8655, (Aug. 1, 2007), 1351-1359.

Sekimoto, Sotaro, et al., "Frequency Compression Techniques of Speech Using Linear Prediction Analysis—Synthesis Scheme", Ann Bull RILP, vol. 13, (Jan. 1, 1979), 133-136.

Simpson, A., et al., "Improvements in speech perception with an experimental nonlinear frequency compression hearing device", Int J Audiol., vol. 44(5), (May 2005), 281-292.

Turner, C. W., et al., "Proportional frequency compression of speech for listeners with sensorineural hearing loss", J Acoust Soc Am., vol. 106(2), (Aug. 1999), 877-86.

NEURAL NETWORK-DRIVEN FREQUENCY TRANSLATION

CLAIM OF PRIORITY AND INCORPORATION BY REFERENCE

This application is a continuation of U.S. patent application Ser. No. 17/647,532, filed Jan. 10, 2022, which is a continuation of U.S. patent application Ser. No. 16/797,157, filed Feb. 21, 2020, now issued as U.S. Pat. No. 11,223,909, which is a continuation of U.S. patent application Ser. No. 15/092,487, filed Apr. 6, 2016, now issued as U.S. Pat. No. 10,575,103, which application claims priority to U.S. Provisional Patent Application No. 62/146,202, filed Apr. 10, 2015, the disclosure of each are hereby incorporated by reference herein in their entirety.

TECHNICAL FIELD

This document relates generally to hearing assistance systems and more particularly to neural network-driven frequency translation for hearing assistance devices.

BACKGROUND

Hearing assistance devices, such as hearing aids, are used to assist patients suffering hearing loss by transmitting amplified sounds to ear canals. In one example, a hearing aid is worn in and/or around a patient's ear.

Frequency lowering algorithms in hearing aids reproduce high-frequency speech cues (such as fricative consonants) at lower frequencies for hearing aid wearers having severe high frequency hearing loss. These frequency lowering algorithms perform poorly in noise, where they are most needed, because consonant detection and extraction is difficult in the presence of noise. Noise tends to obscure the spectral cues that define and differentiate consonants because consonants themselves tend to be noise-like, and because they often tend to have less energy than voiced parts of speech (vowels), especially when they appear at the end of a word. For signal-driven algorithms, the frequency transposition activity may be driven more by noise than speech, because the signal is dominated by the noise, and the translated spectral features are therefore those of the noise. Such algorithms may not provide useful consonant cues in such situations, and when they do, the cues may be poorly differentiated (that is, all consonants sound the same), because spectral contrasts that would ideally be preserved by the algorithm are absent in the noisy speech signal.

There is a need in the art for improved frequency translation in hearing assistance devices.

SUMMARY

Disclosed herein, among other things, are apparatus and methods for neural network-driven frequency translation for hearing assistance devices. Various embodiments include a method of signal processing an input signal in a hearing assistance device, the hearing assistance device including a receiver and a microphone. The method includes performing neural network processing to train a processor to identify acoustic features in a plurality of audio signals and predict target outputs for the plurality of audio signals, and using the trained processor to control frequency translation of the input signal.

Various aspects of the present subject matter include a hearing assistance device including a microphone configured to receive audio signals, and a processor configured to process the audio signals to correct for a hearing impairment of a wearer. The processor is further configured to perform neural network processing to train the processor to identify acoustic features in a plurality of audio signals and predict target outputs for the plurality of audio signals, and to control frequency translation of the input signal using the results of the neural network processing.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present system may be employed in a variety of hardware devices, including hearing assistance devices. The present detailed description will discuss hearing assistance devices using the example of hearing aids. Hearing aids are only one type of hearing assistance device. Other hearing assistance devices include, but are not limited to, those in this document. It is understood that their use in the description is intended to demonstrate the present subject matter, but not in a limited or exclusive or exhaustive sense.

In various embodiments, the present subject matter enhances or replaces frequency-lowering algorithms that reproduce high-frequency speech cues (such as fricative consonants) at lower frequencies for patients having severe high frequency hearing loss, for whom these sounds cannot otherwise be made audible. It is specifically intended to improve frequency-lowering performance in noisy situations.

Various frequency lowering algorithms, include, but are not limited to, those disclosed in the following commonly assigned patents and applications, all of which are incorporated by reference in their entirety: U.S. Pat. No. 8,000,487 to Fitz et al., filed Mar. 6, 2008; U.S. Pat. No. 8,761,422 to Fitz et al., filed on Aug. 11, 2011; U.S. Pat. No. 8,526,650 to Fitz et al., filed on May 5, 2010; U.S. Ser. No. 14/017,093, filed Sep. 3, 2013; U.S. Pat. No. 8,787,605 to Fitz, filed Jun. 12, 2013; U.S. Ser. No. 61/662,738 filed on Jun. 21, 2012; and U.S. Ser. No. 61/660,466 filed on Jun. 15, 2012. Upon reading this disclosure, one of skill in the art will recognize that the present subject matter may applied to different frequency translation approaches, and that the examples given in this disclosure are not intended in an exhaustive or exclusive sense.

Frequency lowering algorithms in hearing aids perform poorly in noise, where they are most needed, because consonant detection and extraction is difficult in the presence of noise. Noise tends to obscure the spectral cues that define and differentiate consonants because consonants themselves tend to be noise-like, and because they often tend to have less energy than voiced parts of speech (vowels), especially when they appear at the end of a word. For signal-driven algorithms, the frequency transposition activity may be driven more by the noise than the speech, because the signal is dominated by the noise, and the translated spectral features are therefore those of the noise. Such algorithms may not provide useful consonant cues in such situations, and when they do, the cues may be poorly differentiated (that is, all consonants sound the same), because spectral contrasts that would ideally be preserved by the algorithm are absent in the noisy speech signal.

The present subject matter improves the detection and extraction of consonants in noisy situations, for the purpose of making them audible to users of frequency translation candidates. Whereas previous frequency lowering systems have generated consonant cues based on high level spectral features assumed to be relevant, the present subject matter leverages modem machine learning techniques, such as neural networks, to learn automatically the relationship between noisy speech input and desired frequency-lowered cues. In various embodiments, the system incorporates temporal context to enable the network to detect consonants that are masked by background noise.

Disclosed herein, among other things, are apparatus and methods for neural network-driven frequency translation for hearing assistance devices. Various embodiments include a method of signal processing an input signal in a hearing assistance device, the hearing assistance device including a receiver and a microphone. The method includes performing neural network processing to train a processor to identify acoustic features in a plurality of audio signals and predict target outputs for the plurality of audio signals, and using the trained processor to control frequency translation of the input signal.

Various aspects of the present subject matter include a hearing assistance device including a microphone configured to receive audio signals, and a processor configured to process the audio signals to correct for a hearing impairment of a wearer. The processor is further configured to perform neural network processing to train the processor to identify acoustic features in a plurality of audio signals and predict target outputs for the plurality of audio signals, and to control frequency translation of the input signal using the results of the neural network processing.

Neural networks are prominent members of a class of supervised machine learning algorithms that also includes Gaussian mixture models, support vector machines, and others. Supervised machine learning algorithms, specifically neural networks, have very recently assumed a dominant role in signal processing, owing in part to recent advances in training strategies and algorithms. Some acoustic signal algorithms, such as provided in Healy et al.'s work in speech enhancement (Healy et al., 2013), demonstrate applications of acoustic signal processing.

Some important algorithmic issues to resolve are the nature of the network input and output layers: what does it learn from, and what does it learn to do. Some research in neural network-driven speech processing has employed high-level acoustic features similar to those used in other acoustic signal classification and processing, like spectral slope, modulations, etc. On the other hand, some recent findings (e.g. (Chen et al., 2014)) suggest that networks employing only raw, low-level features, such as gamma tone spectra, perform very favorably in speech enhancement tasks. In principle, a network of sufficient size with sufficient training should be able to manufacture any high-level feature it needs from the constituent low-level features. With practical network topologies and finite-size training sets, however, this is not guaranteed, and some combination of high- and low-level features may be optimal, and we consider any combination of high- and/or low-level acoustic features to be within the scope of this disclosure.

A key element of the proposed approach is the mapping of input features to frequency-lowered speech cues. In this context, different network outputs are possible, from parameters and configurations of an existing algorithm—such as those identified herein—to the lowered cues (weighted overlap add (WOLA) subband coefficients or time-domain samples) themselves. This range of possibilities is considered to be within the scope of this disclosure, since the nature of the learning and processing algorithm is similar.

Many acoustic features of speech (especially spectral features) are made unreliable by the presence of background noise. In fact, since consonants often have less energy than the surrounding speech, they are highly susceptible to masking. This is especially true of word-final consonants. However, the speech that precedes these consonants often contains clues (such as co-articulation cues) that serve to enhance the consonants or make them easier to perceive (or predict). Therefore, a critical component of the present disclosure is the incorporation of temporal context (or history) in the neural network.

Networks with feedback ("recurrent networks") incorporate history by design, much like recursive (IIR) digital filters. Another possibility is to employ features collected over several frames, rather than relying only on the current frame (analogous to finite impulse response, or FIR digital filters). This has the effect of increasing the number of nodes on the network input layer by a factor equal to the number of frames considered. In various embodiments, similar performance can be achieved by using features smoothed over several frames.

In various embodiments, similar performance may be achieved using a decimated sequence of features (for example, using current features and features from 20 frames earlier, but not the intervening frames). An extension of this concept employs a feature history that is updated in a decimated way, similar to the manner in which we update gains and feedback cancellation (FBC) coefficients in hearing aid firmware. For example, one could employ a history of WOLA coefficients collected over 16 frames, and in each frame, update only one of the coefficients in the history. As in the case of gains and adaptive filter coefficients, decimated update may save considerably in computation, as well as storage. All of these options allow the network to incorporate significant temporal context without greatly increasing the network size. Various methods of incorporating temporal context are within the scope of this disclosure.

The present subject matter includes a system providing a learning algorithm for classification using machine learning techniques. In various embodiments, the learning algorithm learns to classify phonemes. A rule system is used to select the frequency-lowered cue based on the classifier output (the estimated phoneme class), in various embodiments. Another application of the present subject matter is mapping, or determining an unknown function relating inputs to outputs. In various embodiments, the present system learns a mapping from acoustic input features (e.g. spectral features) to frequency-lowered cues or to optimal algorithm parameters for producing those cues. In various embodiments, the present system learns to process them to make them more intelligible. In various embodiments, the present system learns from more comprehensive, low-level acoustic input, and allows a neural network to learn how to extract the essential features, rather than prescribing the features a priori.

In various embodiments, neural network-based processing generalizes and infers the optimal relationship from a large number of examples, referred to as a training set. Elements of the training set comprise an example of network input and the desired target network output. During the training process, which can be done offline, the network configuration is adapted gradually to optimize its ability to correctly predict the target output for each input in the training set. During a training phase, example system inputs are provided to the algorithm along with corresponding desired outputs, and over many such input-output pairs, the learning algorithms adapt their internal states to improve their ability to predict the output that should be produced for a given input. For a well-chosen training set, the algorithm will learn to predict outputs for inputs that are not part of the training set. This contrasts with traditional signal processing methods, in which an algorithm designer has to know and specify a priori the relationship between input features and desired outputs. Most of the computational burden in machine learning algorithms (of which neural networks are an example) is loaded on the training phase. The process of adapting the internal state of a neural network from individual training examples is not costly, but for effective learning, very large training sets are required. In various embodiments, learning takes place during an offline training phase, which is done in product development or research, but not in the field. Network training can be performed online, in other embodiments.

A number of different neural network inputs can be used, in various embodiments. In one approach, the network is provided with the lowest-level features such as samples or spectra, allowing the network to learn from the greatest possible breadth of information. An alternative approach is to provide higher-level, or more abstract features as input, guiding the network towards interpretations of the data that are known to be useful. In various embodiments, a combination of high- and low-level features may be used. Any combination of high- and/or low-level acoustic features for use as neural network inputs is within the scope of this disclosure. A number of different neural network outputs can be used, in various embodiments, and span a similar range from high to low level.

In various embodiments, other supervised machine learning algorithms can be employed in place of neural networks. The neural network can also be implemented on a device other than the hearing aid, for example, on a smart phone. In certain embodiments, the neural network training, or some part of it, can be performed online. For example, based on data collected from the hearing aid wearer's experience, the neural network can be retrained (or refined through additional training) on a smart phone, which can then download the updated network weights and/or configuration to the hearing aid. Based on data collected from a group of hearing aid wearers' experiences, such as collected on a server in the cloud, the neural network can be retrained in the cloud, connected through the smart phone, which can then download the updated network weights and/or configuration to the hearing aid in further embodiments.

Figure 1:
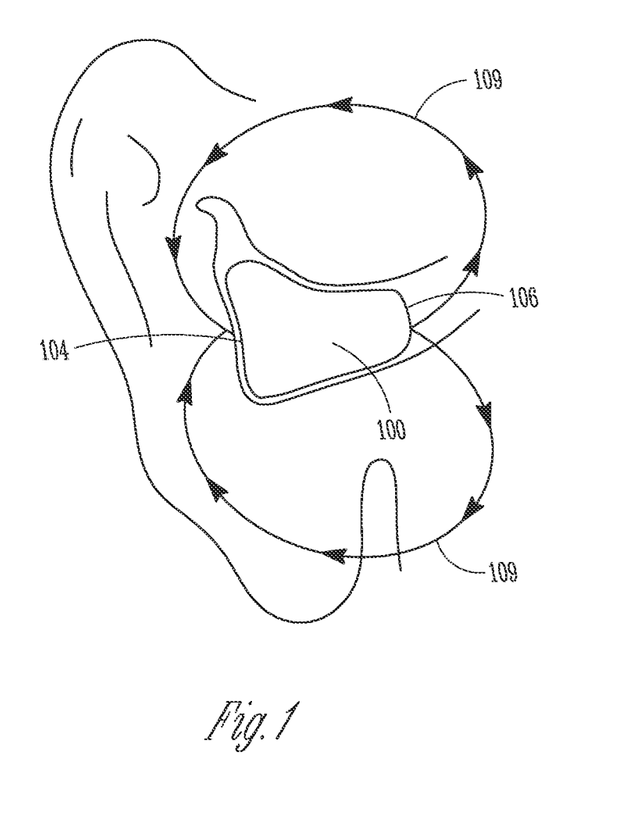
FIG. 1 is a diagram demonstrating, for example, an acoustic feedback path for one application of the present system relating to an in the ear hearing aid application, according to one application of the present system.

FIG. 1 is a diagram demonstrating, for example, an acoustic feedback path for one application of the present system relating to an in-the-ear hearing aid application, according to one embodiment of the present system. In this example, a hearing aid 100 includes a microphone 104 and a receiver 106. The sounds picked up by microphone 104 are processed and transmitted as audio signals by receiver 106. The hearing aid has an acoustic feedback path 109 which provides audio from the receiver 106 to the microphone 104.

Figure 2:
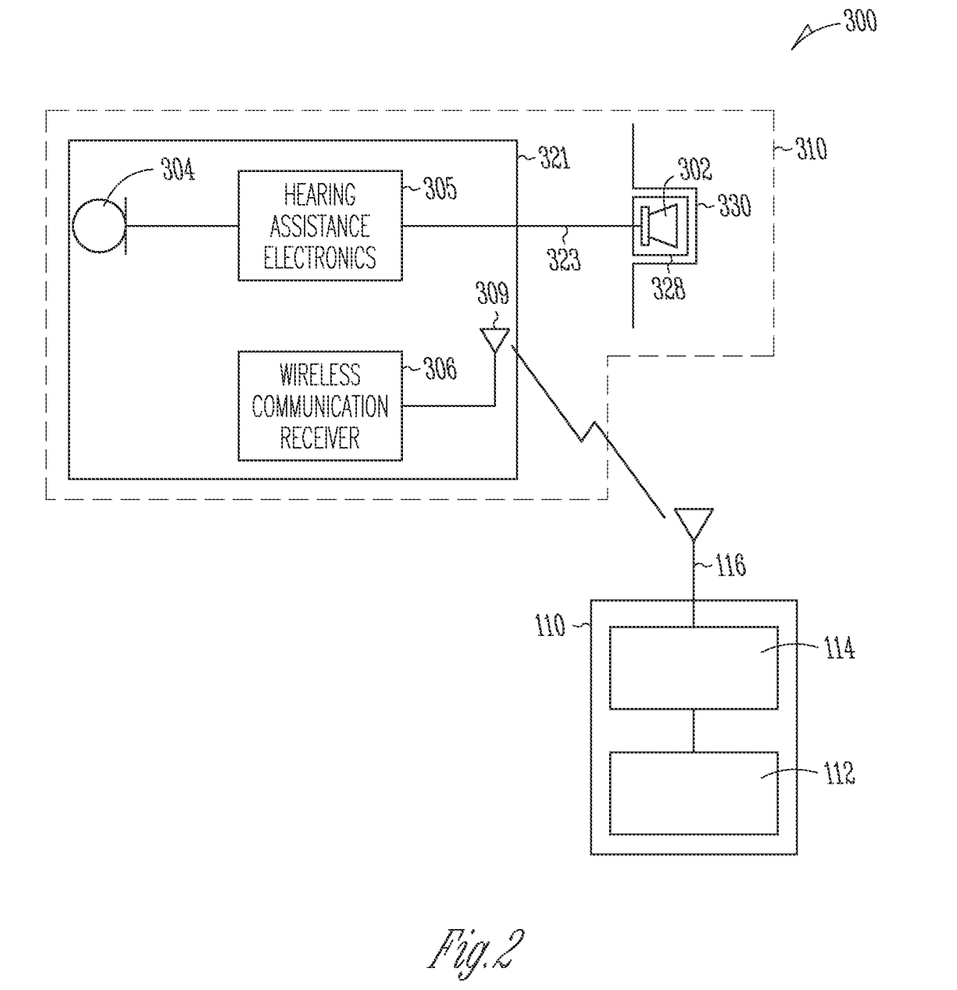
FIG. 2 illustrates a block diagram of a system including a hearing assistance device adapted to be worn by a wearer and an external device, according to various embodiments of the present subject matter.

FIG. 2 illustrates a block diagram of a system 300, according to the present subject matter. The illustrated system 300 shows an external device 110 in wireless communication with a hearing assistance device 310. In various embodiments, the hearing assistance device 310 includes a first housing 321, an acoustic receiver or speaker 302, positioned in or about the ear canal 330 of a wearer and conductors 323 coupling the receiver 302 to the first housing 321 and the electronics enclosed therein. The electronics enclosed in the first housing 321 includes a microphone 304, hearing assistance electronics 305, a wireless communication receiver 306 and an antenna 307. In various embodiments, the hearing assistance electronics 305 includes at least one processor and memory components. The memory components store program instructions for the at least one processor. The program instructions include functions allowing the processor and other components to process audio received by the microphone 304 and transmit processed audio signals to the speaker 302. The speaker emits the processed audio signal as sound in the user's ear canal. In various embodiments, the hearing assistance electronics includes functionality to amplify, filter, limit, condition or a combination thereof, the sounds received using the microphone 304.

In the illustrated embodiment of FIG. 1, the wireless communications receiver 306 is connected to the hearing assistance electronics 305 and the conductors 323 connect the hearing assistance electronics 305 and the speaker 302. In various embodiments, the external device 110 includes a computer or smart phone. The external device 110 includes an antenna 116 connected to wireless communications electronics 114 that include a transmitter, in an embodiment. In various embodiments, the external device 110 includes a processor 112 connected to the wireless communications electronics 114 configured to be trained for frequency translation, and the resulting control signals can be wirelessly communicated to the hearing assistance device 310.

In various embodiments, the training is performed on the hearing device processor. In further embodiments, the training is performed an external device, for example on a server in a cloud or on a smart phone, where neural network processing runs on the server or smart phone and a signal is sent to the hearing device to update parameters of frequency translation on the hearing assistance device.

Hearing assistance devices typically include at least one enclosure or housing, a microphone, hearing assistance device electronics including processing electronics, and a speaker or "receiver." Hearing assistance devices can include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components can be employed without departing from the scope of the present subject matter. Antenna configurations can vary and can be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains can be employed to adjust the hearing assistance device output to a wearer's particular hearing impairment. The processor can be a digital signal processor (DSP), microprocessor, microcontroller, other digital logic, or combinations thereof. The processing can be done by a single processor, or can be distributed over different devices. The processing of signals referenced in this application can be performed using the processor or over different devices. Processing can be done in the digital domain, the analog domain, or combinations thereof. Processing can be done using subband processing techniques. Processing can be done using frequency domain or time domain approaches. Some processing can involve both frequency and time domain aspects. For brevity, in some examples drawings can omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which can or cannot be explicitly shown. Various types of memory can be used, including volatile and nonvolatile forms of memory. In various embodiments, the processor or other processing devices execute instructions to perform a number of signal processing tasks. Such embodiments can include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein can be created by one of skill in the art without departing from the scope of the present subject matter.

It is further understood that different hearing assistance devices can embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter is demonstrated for hearing assistance devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices can include devices that reside substantially behind the ear or over the ear. Such devices can include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices. The present subject matter can also be used in deep insertion devices having a transducer, such as a receiver or microphone. The present subject matter can be used in devices whether such devices are standard or custom fit and whether they provide an open or an occlusive design. It is understood that other hearing assistance devices not expressly stated herein can be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device comprising:
a microphone configured to receive an input signal and provide an audio signal based on the input signal; and
a processor configured to:
process the audio signal to correct for a hearing impairment of a wearer; and
control frequency translation of the audio signal using a neural network, the neural network trained, on a device external to the hearing device, to identify acoustic features in a plurality of audio signals and predict outputs for the plurality of audio signals by mapping features of the plurality of audio signals to a set of algorithm parameters for producing frequency-lowered speech cues.

2. The hearing device of claim 1, further comprising a wireless communication receiver and an antenna configured for communication with the device external to the hearing device.

3. The hearing device of claim 1, wherein the processor is configured to amplify the input signal received by the microphone to control frequency translation of the input signal.

4. The hearing device of claim 1, wherein the processor is configured to filter the input signal received by the microphone to control frequency translation of the input signal.

5. The hearing device of claim 1, wherein the processor is configured to limit the input signal received by the microphone to control frequency translation of the input signal.

6. The hearing device of claim 1, wherein the processor is configured to condition the input signal received by the microphone to control frequency translation of the input signal.

7. The hearing device of claim 1, wherein the processor is configured to use a decimated sequence of features to train the processor to identify acoustic features in the plurality of audio signals and predict outputs for the plurality of audio signals.

8. The hearing device of claim 1, wherein the processor is configured to map input features of the plurality of audio signals to a set of algorithm parameters for producing frequency-lowered speech cues.

9. The hearing device of claim 8, wherein the frequency-lowered speech cues include weighted overlap add (WOLA) subband coefficients.

10. The hearing device of claim 2, wherein the hearing device is a hearing aid.

11. A hearing device comprising:
a microphone configured to receive an input signal and provide an audio signal based on the input signal; and
a processor configured to:
process the audio signal to correct for a hearing impairment of a wearer; and
control frequency translation of the audio signal using weighted coefficients received from an external device, the weighted coefficients derived by the external device using a neural network trained to identify acoustic features in a plurality of audio signals and predict outputs for the plurality of audio signals.

12. The hearing device of claim 11, wherein the external device includes a smart phone configured to communicate with the hearing device.

13. The hearing device of claim 11, wherein the external device includes a server configured to communicate with the hearing device.

14. The hearing device of claim 11, wherein the external device is configured to use data collected from the hearing device to train the neural network to identify acoustic features in the plurality of audio signals.

15. The hearing device of claim 11, wherein the external device is configured to use data collected from a plurality of hearing devices to train the neural network to identify acoustic features in the plurality of audio signals.

16. The hearing device of claim 11, wherein training the neural network to identify acoustic features in a plurality of audio signals and predict outputs for the plurality of audio signals includes training the neural network to identify relationships between noisy speech input and frequency lowered cues.

17. The hearing device of claim 11, wherein training the neural network to identify acoustic features in a plurality of audio signals and predict outputs for the plurality of audio signals includes training the neural network to detect consonants in speech that are masked by background noise.

18. The hearing device of claim 11, wherein the hearing device is a hearing aid.

19. The hearing device of claim 18, wherein the hearing aid is a behind-the-ear (BTE) hearing aid.

20. The hearing device of claim 18, wherein the hearing aid is an in-the-ear (ITE) hearing aid.

* * * * *